United States Patent
Cornelius

[11] 3,854,759
[45] Dec. 17, 1974

[54] APPARATUS FOR INTERCONNECTING A HYDRANT AND A RISER

[75] Inventor: Gail Cornelius, Portland, Oreg.

[73] Assignee: R. M. Wade & Co., Portland, Oreg.

[22] Filed: Mar. 27, 1973

[21] Appl. No.: 345,283

[52] U.S. Cl. .......................... 285/251, 285/DIG. 16
[51] Int. Cl. ........................ F16l 33/00, F16l 47/00
[58] Field of Search ...... 138/89, 109, 112; 137/272, 137/321, 320, 322; 285/40, 251, 248, 242, 255; 220/39 R; 29/157; 61/12

[56] References Cited
UNITED STATES PATENTS

| | | | |
|---|---|---|---|
| 1,962,534 | 6/1934 | Sweetland | 137/295 X |
| 2,033,880 | 3/1936 | Coles et al. | 137/322 X |
| 2,726,682 | 12/1955 | Conroy et al. | 138/109 X |
| 2,798,745 | 7/1957 | Nelson | 285/251 X |
| 3,032,358 | 5/1962 | Rolston | 285/251 X |
| 3,039,641 | 6/1962 | Rosan | 220/39 |
| 3,436,104 | 4/1969 | Jackson et al. | 285/242 |
| 3,695,632 | 10/1972 | Kruse | 285/285 X |

FOREIGN PATENTS OR APPLICATIONS

| | | | |
|---|---|---|---|
| 633,182 | 12/1949 | Great Britain | 285/40 |
| 146,365 | 7/1954 | Sweden | 285/242 |
| 215,097 | 11/1968 | U.S.S.R. | 61/12 |

Primary Examiner—Richard C. Queisser
Assistant Examiner—Daniel M. Yasich
Attorney, Agent, or Firm—Phillips, Moore, Weissenberger, Lempio & Strabala

[57] ABSTRACT

A hydrant is provided with a tubular portion having an outer surface of frusto-conical configuration, and defining threads. The tubular portion is secured directly to a plastic riser pipe, the threads on the outer surface of the tubular portion forming threads on the inner surface of the riser pipe as the two parts are secured together. A metal band is loosely disposed about the riser pipe, and limits outward spreading of the riser pipe to a predetermined amount during such process of securing the two parts together in the area of such forming of the threads, so that a water-tight seal is provided between the tubular portion and riser pipe.

5 Claims, 1 Drawing Figure

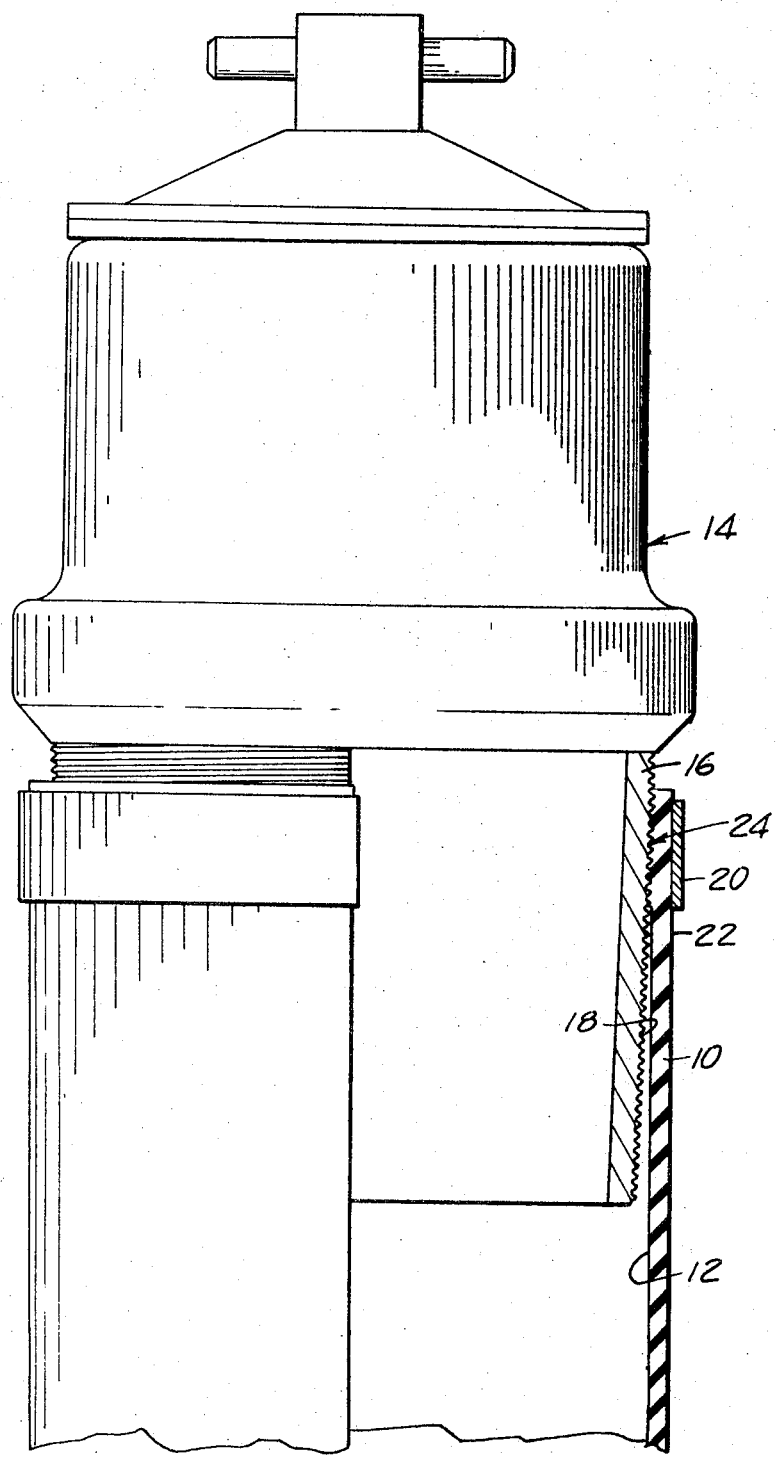

APPARATUS FOR INTERCONNECTING A HYDRANT AND A RISER

BACKGROUND OF THE INVENTION

This invention relates to pipe interconnecting apparatus, and more particularly, to apparatus for interconnecting a hydrant and a riser pipe.

Recently, plastic pipe has become more and more a standard material used for underground pipe installations. In general, the conventional practice is to bury a long plastic main line of 8 or 10 inches diameter plastic pipe, and, at spaced intervals along this pipe, to install couplings and plastic riser pipes for feeding water to the above-ground aluminum lines.

One problem which occurs in installing this type of system is the connection of the plastic riser pipe to the conventional aluminum hydrant which is used to feed the above-ground aluminum line. The most common practice is to glue a male threaded adaptor onto the top of the plastic riser pipe. An aluminum adaptor fixed to the hydrant and having female threads is then threadably engaged therewith.

It has been found that such means of attaching the respective parts works satisfactorily, but is relatively complicated and expensive, considering the complication and cost of the male adaptor, the female adaptor, and the process of gluing the male adaptor to the pipe.

SUMMARY OF THE INVENTION

It is an object of this invention to provide extremely simple, inexpensive means for interconnecting a hydrant to a riser pipe.

It is a still further object of this invention to provide such means which, while fulfilling the above object, provide an extremely effective water-tight seal between such hydrant and riser pipe.

Broadly stated, the apparatus for interconnecting a hydrant with a riser pipe comprise a tubular body portion fixed relative to and communicating with the hydrant and extending inwardly of the riser pipe, and defining an outer surface tapered downwardly inwardly of the riser pipe and in threaded engagement with the inner surface of the riser pipe. Means are disposed about the riser pipe in the area of engagement of the inner surface of the riser pipe with the tapered outer surface of the tubular body portion to limit outward movement of the riser pipe in relation to the tubular body portion, and to provide substantially sealing relation of the inner surface of the riser pipe and the tapered outer surface of the tubular body portion. Also broadly stated, disclosed herein is a method of interconnecting a hydrant with a riser pipe comprising the steps of (i) providing a tubular body portion fixed relative to and communicating with the hydrant, and having a tapered outer surface defining threads, (ii) inserting the tubular body portion into the riser pipe to bring the tapered, threaded outer surface thereof into intimate relation with the inner surface of the riser pipe, and (iii) rotating the tubular body portion relative to the riser pipe to thread the tubular body portion into the riser pipe, forming threads on the inner surface of the riser pipe and bringing the outer surface of the tubular body portion into threaded engagement with the inner surface of the riser pipe.

BRIEF DESCRIPTION OF THE DRAWING

These and other objects of the invention will become apparent from a study of the following specification and drawing, which is a side elevation, partially in section, of the inventive apparatus for interconnecting a hydrant with a riser pipe.

DESCRIPTION OF THE PREFERRED EMBODIMENT

Referring to the drawing, there is shown a plastic riser pipe 10 which is connected to and communicates with a long, buried plastic main line pipe in accordance with conventional practice. The plastic riser pipe 10 defines an inner surface 12 of substantially cylindrical configuration. The hydrant 14 associated therewith has a tubular body portion 16 fixed relative thereto and communicating with the hydrant 14. In the drawing, this tubular body portion 16 is shown as extending inwardly of the riser pipe 10.

The outer surface 18 of the tubular body portion 16 is substantially frusto-conical in configuration, and tapers downwardly and inwardly of the riser pipe 10. Such outer surface 18 defines threads as shown. A continuous annular metal band 20 is disposed about the riser pipe 10 in close proximity to the outer surface 22 of the riser pipe 10.

In the practice of the invention, the tubular body portion 16 is inserted into the riser pipe 10 to bring the tapered, threaded outer surface 18 thereof into intimate relation with the inner surface 12 of the riser pipe 10. The hydrant 14 (and tubular body portion 16) are rotated relative to the riser pipe 10 to thread the tubular body portion 16 into the riser pipe 10, forming threads on the inner surface 12 of the riser pipe 10, thereby bringing the outer surface 18 of the tubular body portion 16 into threaded engagement with the inner surface 12 of the riser pipe 10.

The metal band 20 acts to limit the outward movement or spreading of the riser pipe 10 in relation to the tubular body portion 16, in the area of engagement of the inner surface 12 of the riser pipe 10 with the tapered outer surface 18 of the body portion 16. Such area of engagement is indicated by the numeral 24. The metal band eitehr sits loosely on the outer end of the pipe 10 or is held loosely in place by known means such as adhesive, etc. Thus, as the tubular body portion 16 is screwed directly into the plastic riser pipe 10, it tightens against the metal band 20. Through such tightening, sealing relation of the inner surface 12 of the riser pipe 10 and the outer surface of the tubular body portion 16 is provided.

In this particular embodiment, the hydrant 14 and tubular body portion 16 thereof can be with advantage of either steel or aluminum. The taper of the surface portion 18 used in this embodiment is ¾ inch per foot of length. The annular metal band 20 is chosen as 0.020 inch larger than the nominal outer diameter of the plastic riser pipe 10 itself. Such oversizing of the band 20 is provided to allow for slight size differences in the plastic riser pipe 10. The band 20 may also, with advantage, be of either steel or aluminum.

The means and method described have been found to provide an extremely effective connection between a hydrant 14 and a riser pipe 10. It will be apparent that the connection may be quickly made in the field without pre-cutting and gluing members at the dealer's place of business, which were necessary in the prior art apparatus previously described. Consequently, the means disclosed herein are far less expensive than the prior art means.

What is claimed is:

1. Apparatus for interconnecting a hydrant with an unthreaded riser pipe fixed in a vertical position for conducting fluids therethrough comprising:

a tubular body portion fixed relative to and communicating with the hydrant and extending inwardly of the riser pipe, and defining an outer threaded surface tapered downwardly and inwardly of the riser pipe and in threaded engagement with the inner surface of the riser pipe, the diameter of the inwardly extending end of the body portion being smaller than the inner diameter of the riser pipe and the diameter of the body portion toward the hydrant being greater than the inner diameter of the riser pipe; and means disposed about the riser pipe in the area of engagement of the inner surface of the riser pipe with the tapered outer surface of the tubular body portion to limit outward movement to a predetermined amount of the riser pipe in relation to the tubular body portion, and to provide substantially sealing relation of the inner surface of the riser pipe and the tapered outer surface of the tubular body portion.

2. The apparatus of claim 1 wherein the tapered surface is substantially frusto-conical in configuration.

3. The apparatus of claim 2 wherein the riser pipe is of plastic material.

4. The apparatus of claim 3 wherein the means disposed about the riser pipe comprise a continuous annular band disposed about the riser pipe in close proximity to the outer surface thereof.

5. The apparatus of claim 4 wherein the inner surface of the riser pipe is substantially cylindrical.

* * * * *